2,887,502
Patented May 19, 1959

2,887,502

PREPARATION OF ALKYL CHLOROSILANES

Ben A. Bluestein, Schenectady, N.Y., assignor to General Electric Company, a corporation of New York No Drawing. Application June 13, 1957
Serial No. 665,600

8 Claims. (Cl. 260—448.2)

The present invention relates to the preparation of alkylchlorosilanes. It is particularly concerned with a method for obtaining increased yields of methyl hydrogen dichlorosilane ($CH_3SiHCl_2$), which process comprises effecting reaction at an elevated temperature between silicon and methyl chloride in the presence of a tertiary alkyl halide.

In Rochow U. S. Patent 2,380,995, issued August 7, 1945, and assigned to the same assignee as the present invention, there is disclosed and broadly claimed the method of preparing organohalogenosilanes, more particularly hydrocarbon-substituted halogenosilanes, which comprises bringing a hydrocarbon halide, for instance, methyl chloride, into contact with heated silicon.

The present invention is based on my discovery that if the methyl chloride is brought into contact with the heated silicon in the presence of catalytic amounts of a tertiary alkyl halide, and the reaction between the silicon and the methyl chloride component of the gaseous mixture otherwise allowed to proceed in accordance with the teaching of the above-mentioned Rochow patent certain unexpected and desirable results are obtained. The use of the tertiary alkyl halide in the above-described manner permits obtaining increased yields of methyl hydrogen dichlorosilane, than would be otherwise obtained in the absence of the tertiary alkyl halide, while causing little, if any, adverse effect on the yield of dimethyldichlorosilane which is one of the preferred products of the reaction between methyl chloride and silicon. It should be noted that the tertiary alkyl halide is not intended as a reactant with the silicon in the same manner as the methyl chloride.

The tertiary alkyl halide employed may be any one of those commonly known, including tertiary butyl chloride, tertiary butyl bromide, the various tertiary amyl chlorides, higher tertiary alkyl chlorides, etc. Generally, it is desirable that there be present a tertiary grouping

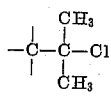

where the remaining valences of carbon are satisfied by either carbon or hydrogen or both.

The tertiary alkyl chloride may be mixed with the methyl chloride while both are preferably in the vapor state so that the tertiary alkyl chloride may advantageously function as a carrier for the methyl chloride vapors. Alternatively the methyl chloride may be passed through a container containing the tertiary alkyl chloride and the combination of the tertiary alkyl chloride and the methyl chloride are then passed together into the heated silicon.

Although the tertiary alkyl halide may be mixed with the methyl chloride reactant in all proportions by weight or by volume, the actual amount of the tertiary alkyl halide used will depend upon the desired ratio of methyl groups to chlorine atoms in the product. Thus, in preparing the methylchlorosilanes, I advantageously use from about 0.01 mol to 2 more mols of the tertiary alkyl halide per mol of methyl chloride employed. Preferably for each mol of methyl chloride used in the reaction, I may mix or employ from approximately 0.1 to 1 mol of the tertiary alkyl halide. As the amount of tertiary alkyl halide present in the reaction zone increases over one mol (per mol of methyl chloride), the amount of trichlorosilane also tends to increase. On a weight basis, the preferable amount of the tertiary alkyl halide, e.g., tertiary butyl chloride, employed in the production of a mixture of methylchlorosilanes is advantageously about 1 to 40 weight percent based on the weight of the methyl chloride used in the reaction.

The temperature at which the mixture of the methyl chloride and tertiary alkyl halide is allowed to contact the silicon may be varied, but generally is above 250° C. and below the decomposition point of the reactants and the products formed. Generally, temperatures varying from about 275° to 500° C. are preferred.

In order that those skilled in the art may better understand how the present invention may be practiced, the following examples are given by way of illustration and not by way of limitation. All parts are by weight.

In the following examples, the finely divided silicon employed in carrying out the reaction described herein was admixed with finely divided copper as catalyst and finely divided zinc as promoter. Use of copper as a catalyst in the reaction of methyl chloride with silicon is more particularly disclosed and claimed in the above-mentioned Rochow Patent 2,380,995. The use of zinc as a promoter is disclosed and claimed in Gilliam U.S. Patent 2,464,033. The silicon copper mixture was placed in a 1″ tube provided with stirring means. The methyl chloride employed was passed in the gaseous state through a container containing tertiary butyl chloride and in this manner the mixture of the methyl chloride and tertiary butyl chloride can be introduced into the reactor in any desired ratio and at a steady rate. The temperature of the tertiary butyl chloride through which the methyl chloride was passed was varied in several instances to vary the amount of tertiary butyl chloride introduced into the reaction zone. The reaction temperature at which the heated silicon-copper-zinc mixture was maintained was also varied. The amount of tertiary butyl chloride carried into the silicon-copper reaction chamber by the methyl chloride vapor was obviously small but nevertheless its effect was marked, it being realized that the solubility of methyl chloride in the tertiary butyl chloride increases with lower temperatures, but at most the solubility only amounts to several percent.

The reaction products were all trapped in a Dry Ice trap, distilled to remove low boiling materials and analyzed by mass spectrometer to determine the percentages of the various chlorosilanes in the reaction product.

EXAMPLE 1

In this example, methyl chloride was passed through tertiary butyl chloride in the manner described above, and thereafter introduced into a reaction tube packed with a mixture of silicon, copper and zinc in a weight ratio of 45 parts silicon, 5 parts copper and 0.1 part zinc. The methyl chloride was passed through the tertiary butyl chloride (which was employed in varying amounts) at a rate of about 8 to 10 grams of methyl chloride per hour. In each instance, the passage of methyl chloride through the tertiary butyl chloride and through the copper-silicon-zinc mixture was continued for about 6 to 7 hours. The following Table I shows the conditions used, the ingredients and amounts of ingredients used, particularly the amount of tertiary butyl chloride employed, as well as the percent of dimethyldichlorosilane (identified as "D"), methyldichlorosilane (identified as "MeH"), methyltrichlorosilane (identified as "T"), trimethylchlorosilane (identified as "M"), and trichlorosilane (HSiCl₃) in the reaction product Table I

| Run No.[1] | Tertiary Butyl Chloride Used (ml.) | t-Butyl Chloride Temp., °C. | Reaction Product | | | | |
|---|---|---|---|---|---|---|---|
| | | | Percent D | Percent MeH | Percent T | Percent M | Percent HSiCl₃ |
| 1 | 54 | 28 | 50.5 | 11.9 | 28.8 | 1.2 | 6.3 |
| 2 | 18 | 10 | 40.8 | 10.2 | 45.2 | 0.7 | 1.3 |
| 3 | 71 | 28 | 31.9 | 15.9 | 38.7 | 0.5 | 11.1 |
| 4 | 15 | 0 | 68.6 | 9.9 | 17.5 | 1.2 | 1.3 |

[1] Runs 1, 2 and 4 were conducted at a temperature (i.e., of the silicon mass) of 325° C., while run 3 was conducted at a temperature of 300° C.

EXAMPLE 2

In this example, methyl chloride was passed through a reservoir containing liquid tertiary butyl chloride maintained at varying temperatures and thereafter passed through a heated reaction zone composed of, by weight, 46.2 parts silicon, 3.7 parts copper, and 0.1 part zinc. In each instance, the run was conducted for a period of about 2.5 hours and the passage of methyl chloride was at a rate of about 8 to 10 grams per hour. The following Table II shows the reaction conditions, as well as the amount of tertiary butyl chloride employed and the temperature of the tertiary butyl chloride. Each run was conducted for about 2.5 hours while the methyl chloride was passed at the rate of about 8 to 10 grams per hour through the tertiary butyl chloride and into the reaction zone which was composed, by weight, of 46.2 parts silicon, 3.7 parts copper, and 0.1 part zinc. The following Table II shows the conditions of the reaction as well as the yields of the various chlorosilanes obtained in the reaction product. In Table II, the designations for the reaction product are the same as those described in Table I above.

Table II

| Run No. | Temp. t-Butyl Chloride, °C. | t-Butyl Chloride Used (ml.) | Reaction Product | | | | |
|---|---|---|---|---|---|---|---|
| | | | Percent D | Percent MeH | Percent T | Percent M | Percent HSiCl₃ |
| 5 | 0 | 12 | 59.9 | 12.4 | 22.7 | 1.8 | 1.3 |
| 6 | −10 | 1 | 66.7 | 10.2 | 18.8 | 1.3 | 0.6 |
| 7 | −5 | 6 | 55.5 | 15.8 | 27.2 | 1.3 | 0 |
| 8 | +5 | 10 | 33.5 | 24.4 | 32.5 | 2.4 | 2.5 |

It should be noted that in connection with the foregoing examples, if no tertiary butyl chloride had been employed, the amount of methyl hydrogendichlorosilane obtained would have been negligible in that it would have been rarely more than 1 to 2 percent.

It will, of course, be apparent to those skilled in the art that in addition to the tertiary butyl chloride employed in the foregoing examples, other tertiary alkyl chlorides may be used, for instance, tertiary amyl chloride, higher alkyl chlorides, e.g., tertiary derivatives of hexyl chloride, octyl chloride, etc. (including the various isomers thereof), wherein the tertiary alkyl chlorides contain the grouping

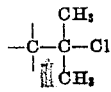

Obviously, the temperature and other conditions of the reaction and the amounts or proportions of ingredients used may be varied within wide limits without departing from the scope of the invention. Where catalysts such as copper or promoters such as zinc are employed, the amount of these materials may be varied within necessary limits to obtain the optimum results.

The methylchlorosilanes, for instance, dimethyldichlorosilane, obtained in the practice of the present invention may be hydrolyzed to give methylpolysiloxanes useful in the preparation of silicone resins, rubbers, and oils which have good heat resistance, and particularly the rubbers and oils which have good low temperature characteristics, making them useful in applications which require resistance to extremes of temperature. The methyl hydrogendichlorosilane obtained as the result of the practice of the present invention is extensively used in the hydrolyzed form in making water-repellents for fabrics, leather, masonry, etc.

What I claim as new and desire to secure by Letters Patent of the United States is:

1. The method which comprises effecting reaction at a temperature of from 250° to 500° C. between silicon and the methyl chloride component of a mixture comprising methyl chloride and a tertiary alkyl chloride, the said reaction being carried out in the presence of copper as a catalyst.

2. The method which comprises effecting reaction at a temperature of from 250° to 500° C. in the presence of a tertiary alkyl halide between heated silicon intimately associated with a catalytic amount of copper and methyl chloride.

3. The method as in claim 2 in which the tertiary alkyl chloride is tertiary amyl chloride.

4. The method which comprises effecting reaction at a temperature of from 250° to 500° C. in the presence of tertiary butyl chloride between heated silicon intimately associated with a catalytic amount of copper and methyl chloride.

5. The method of preparing methylchlorosilanes which comprises effecting reaction at a temperature of from 250° to 500° C. in the presence of a tertiary alkyl chloride between the vapors of methyl chloride and silicon while the latter is intimately associated with copper.

6. The method as in claim 5 in which the tertiary alkyl halide is tertiary butyl chloride.

7. The method as in claim 5 in which the tertiary alkyl halide is tertiary amyl chloride.

8. The process which comprises passing a mixture of methyl chloride and a minor proportion of tertiary butyl chloride, based on the methyl chloride, over silicon maintained at a temperature of from 250° to 500° C. while the silicon is intimately associated with a catalyst comprising finely divided copper and a catalytic amount of zinc as a promoter, and thereafter isolating the formed methylchlorosilanes.

References Cited in the file of this patent

UNITED STATES PATENTS

| 2,380,998 | Sprung et al. | Aug. 7, 1945 |
| 2,427,605 | Hurd | Sept. 16, 1947 |
| 2,447,873 | Rochow | Aug. 24, 1948 |
| 2,464,033 | Gilliam | Mar. 8, 1949 |